J. F. BARRY.
PIPE OR CONDUIT HANGER.
APPLICATION FILED JAN. 20, 1921.
1,399,456.
Patented Dec. 6, 1921.
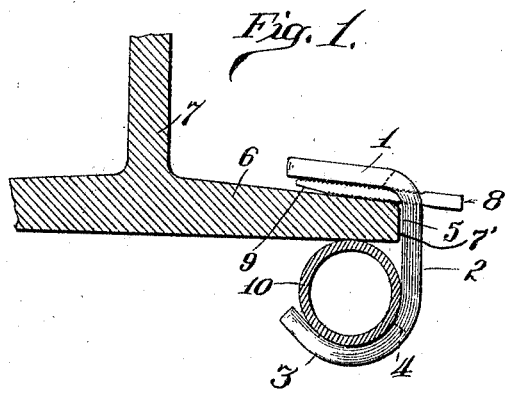
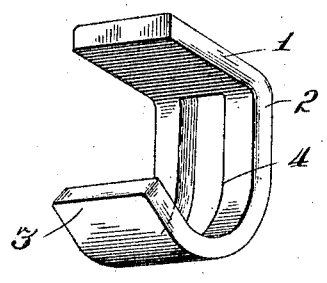
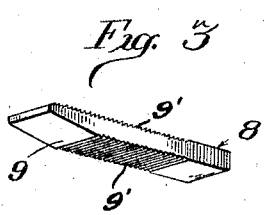
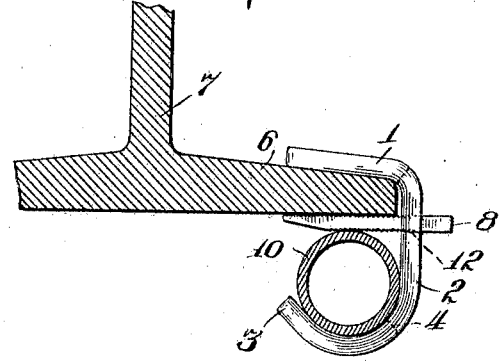
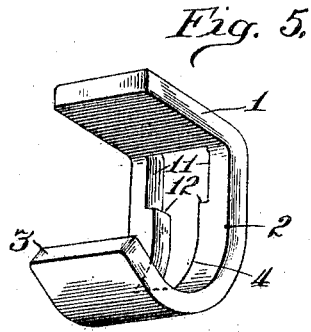
Inventor
James F. Barry
by Daniel J. Brennan.
Attorney

UNITED STATES PATENT OFFICE.

JAMES F. BARRY, OF CHICAGO, ILLINOIS.

PIPE OR CONDUIT HANGER.

1,399,456.  Specification of Letters Patent.  Patented Dec. 6, 1921.

Application filed January 20, 1921. Serial No. 438,632.

*To all whom it may concern:*

Be it known that I, JAMES F. BARRY, a citizen of the United States, residing at Chicago, county of Cook, and State of Illinois, have invented a new and useful Improvement in Pipe or Conduit Hangers, of which the following is a specification.

The invention relates to pipe or conduit hangers and the object of the invention consists therein to provide a hanger for suspending or supporting conduits from I-beams or other flanged carriers.

It is also an object of the invention to provide a pipe hanger whereby one or a plurality of conduits may be suspended from a flanged carrier.

A further object aims at the provision of a hanger whereby one conduit or a plurality of conduits of different diameter may be suspended from a flanged carrier.

A further object of the invention aims at the provision of a pipe hanger which may be quickly and conveniently placed in operative position and removed therefrom without requiring any preliminary work or loss of time.

To the accomplishment of these and other objects, which will become apparent as the description of the invention proceeds, the latter comprises the means set forth in the following specification, particularly pointed out in the claims forming a part thereof, and illustrated in the accompanying drawing, in which:

Figure 1 is a sectional view of an I-beam and a conduit suspended therefrom by the improved hanger;

Fig. 2 is a perspective view of the improved hanger;

Fig. 3 is a perspective view of a detail employed in connection with the hanger for securing the same in functional position;

Fig. 4 is a sectional view of a modified hanger employed in connection with an I-beam, and Fig. 5 is a further modification of the hanger.

In building constructions after the iron frame work is erected and before casting the floors and ceilings, conduits and pipes are arranged but are supported from the I-beam or other frame members by hangers so as to become embedded in the concrete. Again, where the iron structure is exposed and pipes or conduits are to be suspended therefrom, hangers are utilized to insure the maintenance of the pipes or conduits in proper position. In accordance with the invention a hanger is provided which is adapted to receive a conduit and be secured to a beam in a convenient and expeditious manner.

As indicated in the drawing and particularly Fig. 1, the preferred form of the hanger comprises a plate 1 which is tempered so as to possess a small degree of resiliency, the underside of said plate being serrated, and is formed with a depending portion 2, having an upwardly curved seat portion 3. The seat 3 is adapted to encompass the arc of a circle and as the arc is less than a semi-circle, conduits of various diameters may be received in said seat. The depending portion 2 of the hanger is provided with a longitudinal slot 4 extending from the plate 1 to a point near the medial portion of the seat 3.

The hanger is assembled in this form, so that the plate 1 lies above the flange 6 of the I-beam 7, and the depending portion 2 abuts the edge 7' of said flange; a conduit 10 being receivable between the seat 3 and under surface of the flange 6, a wedge or shim 8 extending through the slot 4 and between the plate 1 and the upper surface of the flange 6. The shim 8 is provided with a beveled portion 9 which facilitates insertion of the wedge, and said wedge is also provided with serrations 9'—9' on the opposite faces thereof for engagement with the serrations on the plate 1 and for frictional engagement with the upper surface of the flange 6. The conduit 10 will thus be securely held to the I-beam, when the wedge is driven home, the semi-resilient nature of the plate 1 coöperating with the wedge for the purpose expressed.

In the modified form of the invention shown in Figs. 4 and 5, the hanger is substantially the same shape, and has the same parts as that of Fig. 1, and therefore those parts like the first described form have the same reference characters and will not be again described. The principal difference in this form over the preferred form lies in the enlargement 11 of the slot 4 to provide shoulders 12—12, this enlargement 11 extending from the plate 1 to a sufficient distance that the shoulders 12 will lie below the under surface of the flange 6, in order that the wedge 8 may be inserted. In this arrangement, the wedge engages between the conduit 10 supported in the seat 3, and when the wedge is driven home, the serrations thereon, coupled with the semi-resilient nature of the plate 1 and seat 3 will serve to effectively retain the conduit against accidental displacement.

The drawings disclose several embodiments of the principle on which the invention is predicated, but various changes and alterations may be made within the scope of the invention. It is, therefore, not my intention of confining myself to the details exactly as shown but to include all such changes, modifications and deviations constituting departures within the purview of the invention as defined by the appended claims.

I claim:

1. In combination, a flanged support, a hanger having a portion adapted to overlie one of the flanged portions of said support and provided with a depending portion having a seat located below the flange, and frictional retaining means inserted between said flange and overlying hanger portions and engaging the opposite surfaces thereof.

2. In combination a support having a flange, a hanger formed of a single plate having a seat on one side the flange and a tongue adapted to be disposed on the other side of the flange, and retaining means between and in contact with the inner face of the tongue and the adjacent surface of the flange.

3. In combination, a support having a flange, a hanger formed of a single plate having a seat on one side the flange and a tongue adapted to be disposed on the other side of the flange, and a frictional retaining member having a serrated surface and between and in contact with the inner face of the tongue and the adjacent surface of the flange.

4. In combination, a support having a flange, a hanger formed of a single plate, having a seat on one side the flange and a tongue adapted to be disposed on the other side of the flange and a frictional retaining member extending longitudinally of the tongue and between the same and the adjacent surface of said flange.

5. In combination with an I-beam, a hanger comprising a plate adapted to engage directly over one face of the beam flange and a depending portion formed with a seat below said flange, and wedge means between the plate and adjacent face of said flange for detachably securing said hanger to said beam flange.

6. In combination with a flanged carrier, a hanger comprising a plate adapted to overlie the upper face of the carrier flange and a depending portion formed with a seat below said flange, and wedge means passing through an opening in said depending portion for engagement with the flange to detachably secure said hanger to said carrier.

7. In combination with a flanged carrier, a hanger having a portion for the reception of one or more pipes and arms extending upwardly therefrom and providing a slot, said arm terminating in an end portion adapted to overlie the carrier flange, and a member passing through said slot for engagement with the flange and said overlying portion for detachably securing said hanger to said carrier.

8. In combination, a support having a flange, a hanger comprising a plate having a tongue lying above said flange and a seat lying below the flange, and a wedge inserted between said tongue and the adjacent face of the flange.

9. In combination with an I-beam, a hanger comprising a plate adapted to overlie one face of the beam flange and provided with a shank portion having an integral seat on the other side of said flange and a tapered serrated member passing through the shank and frictionally engaging a portion thereof and at least one face of the flange for detachably securing said hanger to the flange.

10. In combination, with an I-beam, a hanger comprising a plate adapted to overlie one face of the beam flange and provided with a shank portion lying transversely of the flange and having an integral seat on the other side of said flange, said shank having an opening and a wedge member extending transversely of the shank through said opening for frictional gripping contact with at least one face of the flange.

11. In a support, a single plate having a shank bent at one end to provide an integral angularly disposed tongue, and formed at the other end to provide an integral seat, a slot longitudinally disposed in said shank between the tongue and seat, and a retaining member disposed through said slot transversely of said shank.

In testimony whereof, I affix my signature in the presence of two witnesses at 36 W. Randolph street, Chicago, Illinois.

JAMES F. BARRY.

Witnesses:
DANIEL A. BRENNAN,
IRENE MARTIN.